(No Model.)

J. W. WEBB.
HORSE MUZZLE.

No. 250,613. Patented Dec. 6, 1881.

WITNESSES
E. H. Bates
James J. Sheehy

INVENTOR
John W. Webb
by Audnon & Smith
his ATTORNEYS

UNITED STATES PATENT OFFICE.

JOHN W. WEBB, OF UNION SPRINGS, ALABAMA.

HORSE-MUZZLE.

SPECIFICATION forming part of Letters Patent No. 250,613, dated December 6, 1881.

Application filed May 7, 1881. (No model.)

*To all whom it may concern:*

Be it known that I, J. W. WEBB, a citizen of the United States, residing at Union Springs, in the State of Alabama, have invented a new and valuable Improvement in Horse-Muzzles; and I do hereby declare that the following is a full, clear, and exact description of the construction and operation of the same, reference being had to the annexed drawings, making a part of this specification, and to the letters and figures of reference marked thereon.

Figure 1:
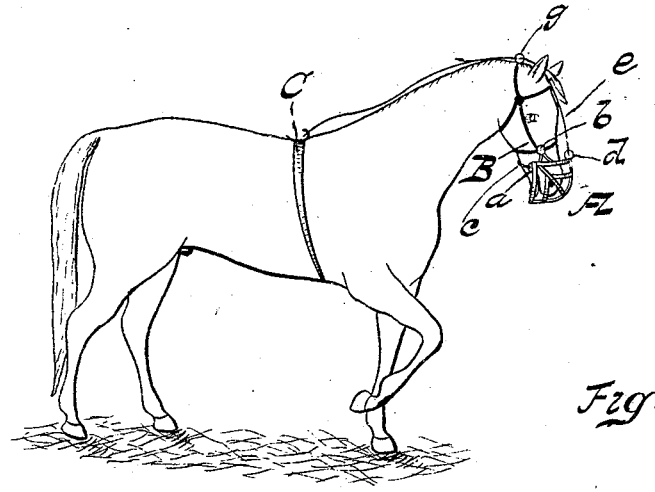
Figure 2:
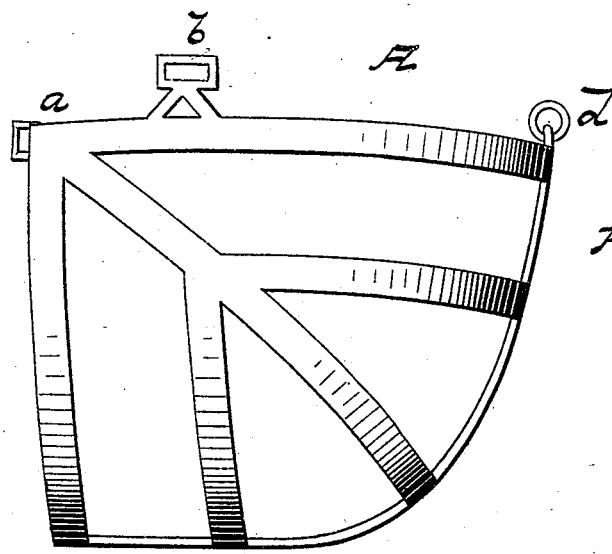

Figure 1 of the drawings is a representation of a side view of my device as applied. Fig. 2 is an enlarged view of the same.

This invention has relation to muzzles for horses and other grazing stock, and is designed to prevent the animals from injuring crops growing in the field in which they are grazing.

The invention consists in the construction and novel arrangement of a muzzle swinging from rings or pivotal points of attachment to the halter or bridle, a girth-connection, and a guide-ring at the top of said halter or bridle, all as hereinafter shown and described.

In the accompanying drawings, the letter A designates the muzzle, which is preferably made of metallic straps in the curved form shown, and having its upper portion and rear open. This muzzle is designed to be connected at the side corners, $a$, or near these angular portions, to the halter or bridle B by means of rings $b$, hooks, or pivots, so that the muzzle will swing freely thereon, its tendency being to gravitate under the lips of the animal when free to act. A check-strap, $c$, is attached to the rear portion of the muzzle and passes around the jaw, being designed to hold the muzzle in place. The front of the muzzle is provided with a ring, $d$, to which is attached the front end of a cord or strap, $e$, which extends over the horse's head, through a pulley loop, ring, or guide, $g$, connected to the top of the halter or bridle, back to the girth C, to which the rear end of said cord is fastened. This cord is designed to have its length between the fastenings at the girth and muzzle adjusted in accordance with the requirements of each animal, so that when its head is raised from the ground the cord will be slack and the muzzle will fall under the lips. The animal cannot then attack the standing grain; but when the lips are brought down to the ground in grazing the depression of the head is designed to render the cord $e$ tense, its action serving to raise the muzzle by its front end, and thus to move it from under the lips of the animal.

As animals vary in height, it is desirable sometimes to hold the girth in its proper place on the body, and this is accomplished by means of a strap running around the breast and shoulders and fastened at each side to the girth.

Having described this invention, what I claim, and desire to secure by Letters Patent, is—

1. The muzzle A, having the open top and rear, the check-strap $c$, and the rings or pivotal attachments $b$ in rear, at or near the side corners, $a$, substantially as specified.

2. The muzzle A, having open top and rear, side pivotal attachments, $b$, and front attachment-ring, $d$, in combination with a bridle or halter, its top guide, $g$, the girth C, and the connecting cord or strap $e$, substantially as specified.

In testimony that I claim the above I have hereunto subscribed my name in the presence of two witnesses.

JOHN WESLEY WEBB.

Witnesses:
C. J. L. CUNNINGHAM,
F. J. FRAZER.